No. 744,708. PATENTED NOV. 24, 1903.
F. BANDY.
COMBINED CULTIVATOR AND COTTON CHOPPER.
APPLICATION FILED MAR. 8, 1902.
NO MODEL. 2 SHEETS—SHEET 2.
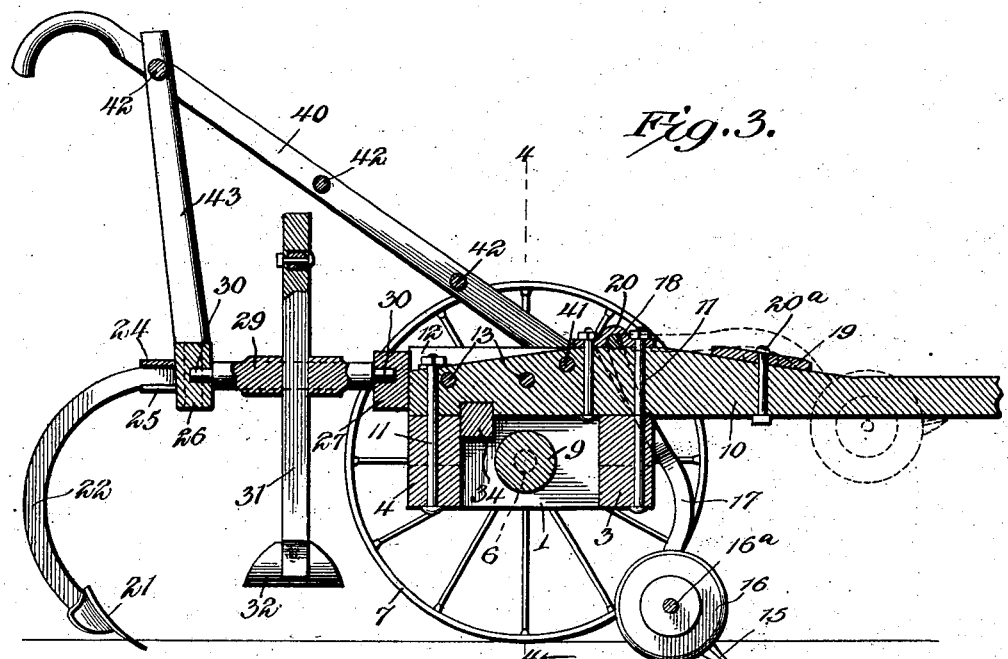
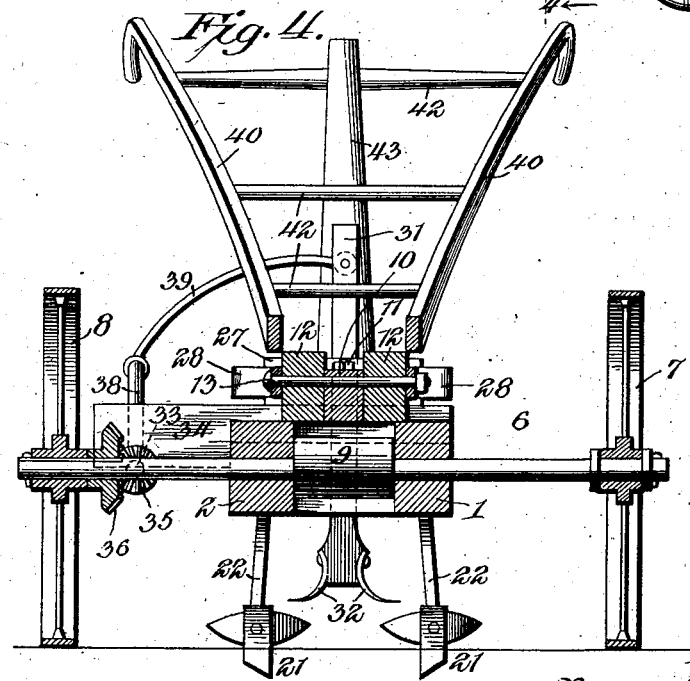
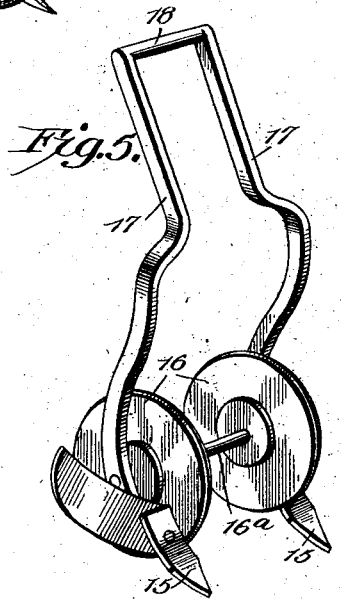
Witnesses
Howard W. Orr
H. P. Shepard
Inventor
Fletcher Bandy,
By E. G. Siggers
Attorney No. 744,708. Patented November 24, 1903.

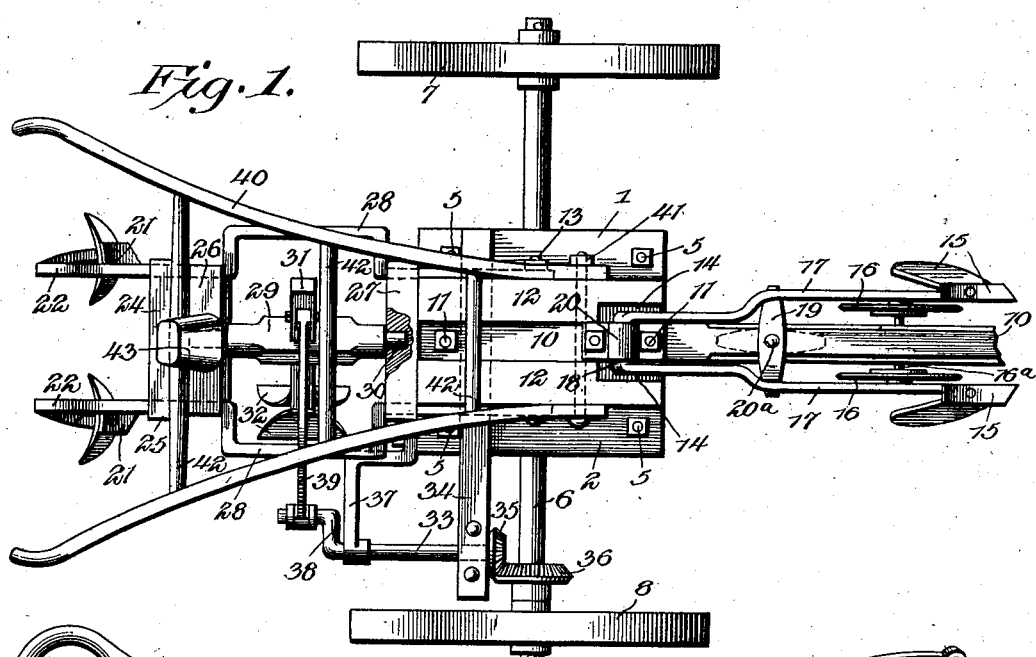

UNITED STATES PATENT OFFICE.

FLETCHER BANDY, OF TRION FACTORY, GEORGIA.

COMBINED CULTIVATOR AND COTTON-CHOPPER.

SPECIFICATION forming part of Letters Patent No. 744,708, dated November 24, 1903.

Application filed March 8, 1902. Serial No. 97,330. (No model.)

*To all whom it may concern:*

Be it known that I, FLETCHER BANDY, a citizen of the United States, residing at Trion Factory, in the county of Chattooga and State of Georgia, have invented a new and useful Combined Cultivator and Cotton-Chopper, of which the following is a specification.

This invention relates to cultivators, and is designed to provide an improved device of this character which is arranged to loosen the hills and turn the same outwardly at opposite sides of rows of cotton, so as to expose the lower ends of the stalks, to chop the latter at intervals, so as to thin out the same, and, finally, to return the loosened earth to the cotton-stalks which are left standing.

It is furthermore designed to provide improved means for cutting down the hills and turning the same to one side preparatory to the chopping action and to have said means arranged so as to be thrown out of operation when not required for use.

Another object is to provide an improved chopping apparatus which is driven from one of the ground-wheels and is arranged to chop during each swinging movement of the chopper.

A final object is to provide an improved frame structure for the support of the various parts of the implement and whereby said parts may be compactly and conveniently arranged, so as to operate in regular succession and also to give convenient access thereto for repairs.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a top plan view of a cultivating and cotton-chopping implement constructed in accordance with the present invention. Fig. 2 is a side elevation thereof. Fig. 3 is a longitudinal sectional view of the implement. Fig. 4 is a cross-sectional view on the line 4 4 of Fig. 3. Fig. 5 is a detail perspective view of the device for loosening the earth preparatory to the chopping operation. Fig. 6 is a detail perspective view of the connecting-rod for operating the chopper.

Like characters of reference designate corresponding parts in all the figures of the drawings.

The frame of the present invention is substantially rectangular in shape and comprises a pair of longitudinal members 1 and 2, which are connected by the front and rear end members 3 and 4, respectively, the meeting ends of the members being mortised and connected by suitable bolts 5, thereby forming an open or skeleton frame. A rotatable axle 6 pierces the longitudinal members of the frame, which form bearings therefor, and is provided at one end with a loose wheel 7 and at its opposite end with a fixed wheel 8, keyed or otherwise secured to the axle so as to rotate therewith. As best illustrated in Figs. 3 and 4, it will be seen that the central portion of the axle is provided with a cylindrical enlargement 9, which is substantially equal in length to the distance between the side members of the frame, there of course being sufficient distance between the ends of the enlargement and the sides of the frame to permit unrestricted rotation of the axle and at the same time to prevent any material endwise play thereof.

Supported centrally upon the end members of the frame and projected in front thereof is a beam or tongue 10, which is held in place by means of bolts 11, piercing the tongue and the respective front and rear ends of the frame. Longitudinal cleats 12 are supported upon the top of the frame and snugly embrace the rear end portion of the beam, to which they are connected by means of the transverse bolts 13. As best indicated in Fig. 1, it will be seen that the front end piece of the frame and the front ends of the cleats 12 are provided with corresponding upwardly and rearwardly inclined notches or recesses 14, which lie at opposite sides of the beam.

For cutting down the hill from which the stalks grow prior to the chopping operation there is provided a pair of cutting-disks 16 and a pair of turning-shovels 15, which are mounted at the outer sides of the adjacent disks, whereby the shovels form scrapers for the disks. The shovels are carried at the lower ends of a pair of swinging arms 17, which are connected at their upper ends by means of a cross-bar 18, that is mounted transversely across the top of the beam and in a bearing 20, located at the upper and rear ends of the sockets or recesses 14 in the front of the frame, whereby the arms are adapted to be received in the recess and to lie against the backs thereof, so as to brace and support the arms in the operative position of the cultivating device. It will be noted that the disks 16 are mounted upon a shaft $16^a$, which also serves to connect the lower ends of the arms 17, so as to brace the same and prevent inward and outward displacement thereof. It will be observed that the arms 17 and the cross-bar 18 form a yoke-shaped hanger, which straddles the beam and is capable of being elevated into the position shown by dotted lines in Fig. 3 and by full lines in Fig. 1 and to be supported therein by means of a cross-head 19, intermediately pivoted to the top of the beam 10 by means of a suitable pivotal connection $20^a$, said cross-head normally lying in longitudinal alinement with the beam and capable of being turned transversely thereof, so as to underlie the arms of the hanger, and thereby support the same in an elevated position with the openers and cultivator-disks out of contact with the earth.

At a suitable distance in rear of the frame are provided a pair of coverer-plows 21, which are carried at the lower ends of bowed metallic standards 22, which are extended forwardly and applied flat against the outer sides of the cleats 12, to which they are connected by means of the transverse bolts 13, which also serve to connect the cleats 12 to the beam, as heretofore explained. Just in advance of the upper ends of the bowed portions of the standards 22 there is provided a cross-bar in the form of a flat metallic strap 24, which is applied to the upper edges of the standards and has each end provided with a pendent and inwardly-directed hook or loop 25, which embraces the adjacent standard and prevents separation of the two standards. In front of the bar 24 is a wooden cross-bar 26, which has its opposite ends notched or recessed for the reception of the horizontal portions of the two standards, and a similar cross-bar 27 is supported upon the standards in the same manner and lies against the rear end of the frame. That portion of each standard which lies between the cross-bars 26 and 27 is bent or bowed outwardly to form an offset portion 28, so as to increase the space between the standards at this point.

A rocking head 29 is mounted longitudinally in the space bounded by the offset standard portions 28 and the front and rear cross-bars 27 and 26, the ends of said head being provided with reduced trunnions 30, mounted in suitable bearing-sockets formed in the inner faces of the cross-bars 26 and 27. A chopper is connected to this rocking head and comprises an upstanding stem or bar 31, which is passed through the rocking head and is provided at its lower end, which is terminated short of the ground-line, with the opposite chopping-blades 32, which are concaved upon their outer sides and projected laterally downward in opposite directions, whereby the chopper is active during each of its swinging movements.

The chopping device is actuated from the axle through the medium of a longitudinal shaft 33, which is disposed between the wheel 8 and frame and in rear of the axle. The front end of this shaft is mounted upon the lower side of a cross-bar 34, which is disposed transversely of the implement and is received within complemental notches formed in the lower sides of the beam and the cleats 12 and in the upper faces of the side members of the frame, one end of the bar being extended outwardly beyond the frame and terminated short of the wheel 8. The forward end of the shaft 33 carries a beveled gear 35, which is in mesh with a beveled gear 36, which is carried by the axle or the adjacent wheel, as may be desired. It will now be understood that the axle is held against material endwise play by means of the enlargement 9, so as to prevent separation of the gears 35 and 36. The rear end portion of the shaft is mounted in a bracket 37, which is carried by the rear end of the frame, and the extreme rear end of the shaft is formed into a terminal crank 38, which works at the rear side of the bracket 37. A bowed connecting-rod 39 has its opposite ends pivotally connected to the crank 38 and the upper end of the chopper-stem 31, whereby a swinging movement is imparted to the latter. It will be observed that the connecting-rod is concaved upon its inner side, so that it may not strike against the adjacent offset portion 28 of the plow-standard.

For convenience in guiding and otherwise handling the implement there is provided a pair of plow-handles 40, the forward ends of which are applied to the outer sides of the cleats 12 and are connected thereto by means of a bolt 41, which pierces the cleats and the beam 10. Suitable cross-bars 42 connect the plow-handles, and the latter incline upwardly and rearwardly, as usual. A standard 43 rises from the cross-bar 26 and receives the uppermost cross-bar 42 of the handles, so as to support the upper rear ends thereof.

In the operation of the device the openers are dropped down into the position shown in Figs. 2 and 3, so as to straddle the row of cotton, and as the implement is moved forward the disks cut down the hill at opposite sides of the row, and the turning shovels or plows 15 turn the loosened earth outwardly and away from the row of cotton, thereby to expose the bases of the stalks to the chopper. The chopper is oscillated or swung transversely of the implement by means of the crank-shaft and the connecting-rod, and by reason of the oppositely-disposed hoes or chopping-blades the chopper is active during its swinging movement in opposite directions, so as to engage the exposed base portion of some of the stalks to chop out portions of the plants and leave intermediate portions standing, and then the coverers 21 act upon the earth which has been turned aside by the plows 15 and return the same inwardly about the cotton-stalks left standing.

From the foregoing description it will be seen that the present implement is arranged to first cut down the hill and turn the same outwardly from the row at opposite sides thereof, so as to expose the base portions of the stalks, then to chop out some of the stalks, and, finally, to return the loosened earth to the stalks, and thereby hill up the same. It is very important that the hill should be first cut down prior to the chopping operation, as otherwise it would be necessary for the chopper to cut through the hill before reaching the stalks, and hence the operation would be very imperfect. Besides chopping the plants the implement also effectually cultivates the earth around the plants, as the hills are first cut down and turned aside and then finally returned to the plants, whereby the hill of earth is loosened and a hard dry hill is obviated. In some instances it may be desirable to merely cultivate instead of chop the plants, in which event the chopping device may be omitted and the implement employed to first loosen and turn out the hill and then return the loosened earth to the plants in the form of a loosely-thrown-up hill.

What I claim is—

1. The combination with a frame having a beam, and a cotton-chopper carried by the frame, of a standard swung at its upper end from the beam in advance of the frame, the latter being located in the rearward path of the standard and forming a stop to limit the rearward swing thereof, and means for engaging the standard at a point between its ends, whereby the standard is supported in an elevated and inoperative position, substantially as described.

2. The combination of a frame having a beam projected in front thereof, the frame being provided with upwardly and rearwardly inclined sockets or recesses disposed at opposite sides of the beam, a chopper carried by the frame and a yoke-shaped standard straddling the beam and swung therefrom, the sockets being located in the rearward path of the standard and the backs thereof forming stops for engagement by the standard members to limit the rearward movement thereof.

3. The combination with a frame having a beam projected in front thereof, and a chopper carried by the frame, of a standard swung from the beam, the front of the frame being located in the rearward path of the standard and forming a stop to limit the rearward swing thereof, and a horizontally-swinging supporting device pivoted upon the beam in advance of the said standard and capable of being swung beneath the same when elevated to support the said standard in an inoperative position.

4. The combination with a frame, having a beam projected in front thereof, and a chopper carried by the frame, of a yoke-shaped standard straddling the beam and hinged at the top to the same, the front of the frame lying in the rearward path of the standard and forming a stop to limit the rearward swing thereof, and a cross-head intermediately pivoted upon the beam and located in advance of the standard and capable of being turned transversely beneath the said standard to support the same when elevated and in an inoperative position.

5. The combination with a frame, and a chopper carried thereby, of means disposed in front of the chopper for cutting down and turning aside a hill, consisting of a pair of turning-shovels arranged to straddle a hill, and upright cutting-disks located in rear of the front portions of the shovels and offset from the same to expose their cutting edges and the said front portions of the shovels, substantially as described.

6. The combination with a frame, and a chopper carried thereby, of means disposed in front of the chopper for cutting down and turning aside a hill, consisting of turning-shovels, and upright cutting-disks located in rear of the front portions of the shovels to expose the same and offset from the shovels to expose their cutting edges, said shovels being also arranged to form scrapers for the disks, substantially as described.

7. The combination with a frame, of opposite longitudinal bars carried thereby and projected rearwardly therefrom, the rear ends of the bars being extended downwardly to form standards, plows carried by the lower ends of the standards, corresponding intermediate portions of the longitudinal bars being provided with outwardly-offset portions, cross-bars connecting the longitudinal bars at opposite ends of the offset portions thereof, and a laterally-swinging chopper located between the offset portions of the longitudinal bars and journaled in the cross-bars.

8. The combination with a wheeled frame, of opposite longitudinal bars carried by the frame and projected rearwardly therefrom, the rear ends of the bars being extended downwardly to form standards, plows carried by the standards, cross-bars connecting the longitudinal bars, a rocking cross-head journaled in the cross-bars, a chopper carried by the cross-head and means for operating the cross-head from one of the wheels of the implement.

9. The combination with a wheeled frame, of opposite longitudinal bars carried thereby and projected rearwardly therefrom, the rear ends of the bars being extended downwardly to form standards, plows carried by the standards, cross-bars connecting the longitudinal bars, a longitudinally-disposed rocking cross-head journaled in the cross-bars, an oscillatory chopper carried by the cross-head, a crank-shaft in operative relation with one of the wheels, and a connecting-rod between the crank-shaft and the cross-head.

10. In a cotton-chopper, the combination with a beam, of a pair of longitudinal bars carried by and projected from the beam and having their rear ends provided with pendent standards, plows carried by the standards, cross-bars connecting the longitudinal bars, a chopper mounted in the cross-bars, handles inclined rearwardly and upwardly from the beam, and a standard rising from one of the cross-bars and supporting the handles.

11. In a cotton-chopper, the combination with a wheeled axle, of a beam supported thereon, hill-turning means hung from the beam, opposite longitudinal bars carried by and projected rearwardly from the beam and having their rear ends extended downwardly to form standards, plows carried by the standards, cross-bars connecting the longitudinal bars, a rocking head journaled in the cross-bars, an oscillatory chopper carried by the rocking head, an operative connection between the rocking head and the wheeled axle, handles secured to the opposite sides of the beam and inclined upwardly and rearwardly therefrom, and a standard rising from the rear cross-bar and supporting the handles.

In testimony that I claim the foregoing as my own I have hereto affixed my signature in the presence of two witnesses.

FLETCHER X BANDY.
his mark

Witnesses:
G. W. BANDY,
C. C. BRYANT.